(12) United States Patent
Chang et al.

(10) Patent No.: US 8,560,864 B2
(45) Date of Patent: Oct. 15, 2013

(54) FIREWALL FOR REMOVABLE MASS STORAGE DEVICES

(75) Inventors: Chin-Hsiung Chang, Tai-Chung (TW); Fu-Chung Yen, Plano, TX (US)

(73) Assignee: FEGO Precision Industrial Co., Ltd., Tai-Chung (TW)

( * ) Notice: Subject to any disclaimer, the term of this patent is extended or adjusted under 35 U.S.C. 154(b) by 674 days.

(21) Appl. No.: 12/055,782

(22) Filed: Mar. 26, 2008

(65) Prior Publication Data

US 2009/0249464 A1    Oct. 1, 2009

(51) Int. Cl.
*G06F 12/14*    (2006.01)
(52) U.S. Cl.
USPC .......................................................... 713/193
(58) Field of Classification Search
USPC ......................................... 726/11, 12, 14, 24
See application file for complete search history.

(56) References Cited

U.S. PATENT DOCUMENTS

| 8,161,510 | B2 * | 4/2012 | Krakora et al. | 725/38 |
| 2001/0038642 | A1 * | 11/2001 | Alvarez et al. | 370/477 |
| 2003/0145183 | A1 * | 7/2003 | Muehring | 711/163 |
| 2008/0141373 | A1 * | 6/2008 | Fossen et al. | 726/23 |
| 2008/0282337 | A1 * | 11/2008 | Crawford | 726/12 |
| 2008/0320581 | A1 * | 12/2008 | Hamilton et al. | 726/11 |

* cited by examiner

*Primary Examiner* — Kambiz Zand
*Assistant Examiner* — Abiy Getachew
(74) *Attorney, Agent, or Firm* — Locke Lord LLP

(57) ABSTRACT

A firewall device comprising a first connection device for connecting with a data device supporting transfer data with a removable mass storage device; second connection device for connecting with the removable mass storage device; and a microprocessor, adapted to control and secure data transfer between the data device and the removable mass storage device.

24 Claims, 6 Drawing Sheets

FIREWALL FOR REMOVABLE MASS STORAGE DEVICES

TECHNICAL FIELD OF THE INVENTION

The present invention relates generally to electronic devices, and, more particularly, to a firewall device for removable mass storage devices.

BACKGROUND OF THE INVENTION

In recent years, removable data storage technology has advanced dramatically with a number of technological breakthroughs. These breakthroughs include increased data storage and exponential data transfer speeds; increased device portability through a substantial reduction in physical device size; increased device availability by the development of mass-appeal low-cost products; and simplified connectivity methods to computer systems. Removable mass storage devices, such as Universal Serial Bus (USB) flash drives, memory sticks, Secure Digital (SD) memory cards, compact flash cards, external hard-drives, or CD/DVD players, etc., are currently popular media for data storage and portability. A removable mass storage device may allow a person to store and carry a large quantity of data, to read or view, and transfer data to and/or from another electronic device. For example, a company's technical support engineer collected a few sets of instrument measurement data at a customer's site for trouble shooting purpose. The data was collected on a computer of the customer's office. The engineer carried the data back his own laboratory by copying the data from the customer's computer to a USB flash drive. The data was downloaded to the engineer's computer from the USB flash drive and the engineer could analyze the data collected at customer site on his/her computer.

Another example is that a patient collects blood pressure data at home several times a day based on his/her doctor's instruction, and the blood pressure data is stored on a Secure Digital (SD) memory card. The doctor at a hospital can view the patient's blood pressure trend by plugging the SD card to a hospital's computer when the patient visits the doctor with the SD card with him. The physical size of a USB flash drive or an SD card is relatively small and is very convenient for carrying data.

Security concerns for transferring data between a removable mass storage device and an electronic device may be desired. A significant issue is that computer virus is widely spread through these removable mass storage devices. Without any virus protection device, a removable mass storage device or other electronic devices may be easily to be infected with virus while the removable mass storage device is connected with another electronic device for data transfer. The high portability of the removable mass storage devices may make virus spread even faster.

Currently many anti-virus programs are widely available on the market and on the Internet. However, an anti-virus program may not detect all types of virus. Furthermore, some electronic devices, especially many personal computers, may not have anti-virus programs installed. Consequently, this may increase probability for a mass storage device or other electronic devices to be infected by virus when a mass storage device is connected with another electronic device without anti-virus protection or data filtering for data transfer.

In certain working environments, such as a public library, a hospital, or a government office, a computer user might not have the authorization to install anti-virus software on a computer that he or she is using. When the computer user copies files from a computer to a removable mass storage device, he or she may not be aware whether a virus is also copied to the removable mass storage device. On the other hand, when the user copies files from a removable mass storage device to a computer, he or she may not guaranty that no virus be copied to the computer.

Other security concerns may include user authorization, or data protection, etc. for data transfer between a removable mass storage device and another electronic device. However, these concerns have not been addressed conventionally.

Moreover, various level of control for the data transfer may be desired. A user of a removable mass storage device may want to have control of types of data that can be transferred between the removable mass storage device and a computer; or limit the directions of data transfer, such as data is only allowed to be transferred from a removable mass storage device to a computer, etc. For instance, a school teacher wants to distribute a school calendar in an Excel format to his/her students. The teacher may ask the students to copy the calendar from a school's computer to the students' personal USB flash drives. The teacher may want to have some control for the data transfer, i.e., copy of calendar. The teacher may restrict that the only file that can be copied is the calendar in Excel format, and data transfer may be allowed only from the computer to a USB flash drive. This control may help prevent students from copying a wrong file, prevent a USB flash drive from being infected by virus, and prevent virus or unwanted files from being copied from students' USB flash drives to the school's computer. The teacher may further enforce some security check by requesting the students to enter a password before copying the calendar to their USB flash drives, or restrict certain windows for allowing the students to copy files from the computer to a USB flash drive.

Therefore, there is a need of a device working as a firewall and the like for a removable mass storage device that may provide control and secure data transfer between the removable mass storage device and another electronic device.

SUMMARY OF THE INVENTION

A firewall device is provided. The firewall device comprises first connection device for connecting with a data device supporting data transfer with a removable mass storage device; second connection device for connecting with the removable mass storage device; and a microprocessor, adapted to control and secure data transfer between the data device and the removable mass storage device.

The following description and drawings set forth in detail a number of illustrative embodiments of the invention. These embodiments are indicative of but a few of the various ways in which the present invention may be utilized.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

The following discussion is presented to enable a person skilled in the art to make and use the invention. The general principles described herein may be applied to embodiments and applications other than those detailed below without departing from the spirit and scope of the present invention as defined herein. The present invention is not intended to be limited to the embodiments shown, but is to be accorded the widest scope consistent with the principles and features disclosed herein.

Figure 1C:
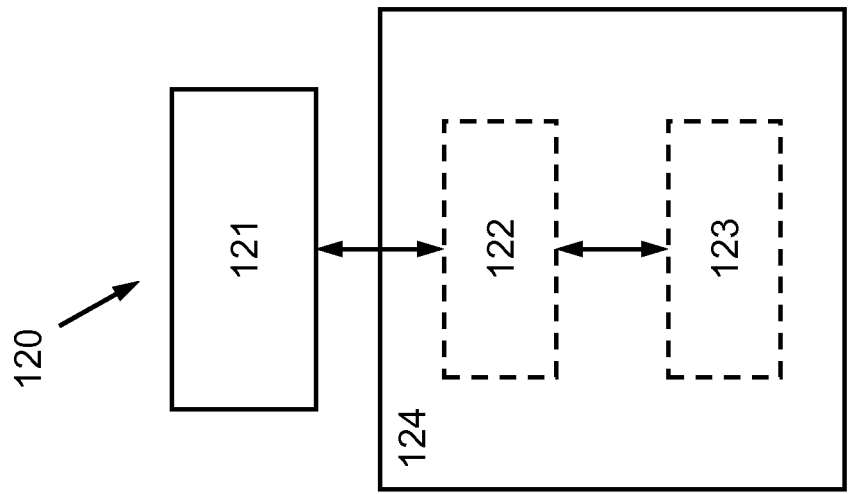
FIGS. 1A, 1B, and 1C are embodiments of firewall system structures according to the present invention.
Figure 1B:
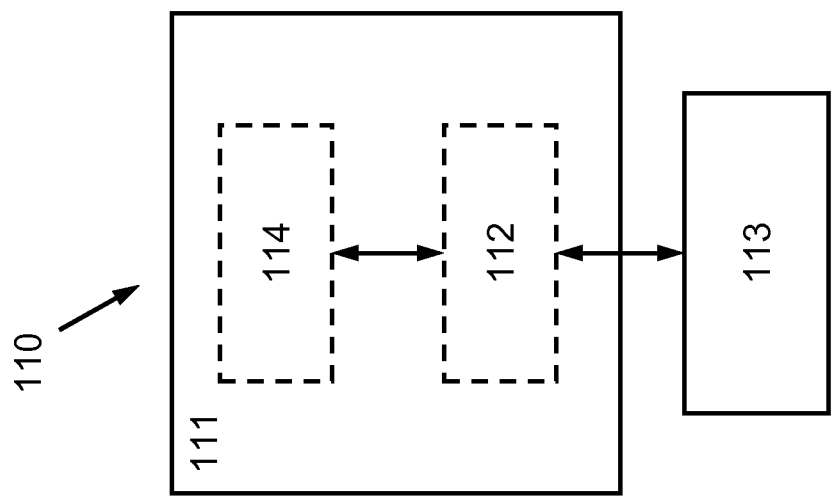
Figure 1A:
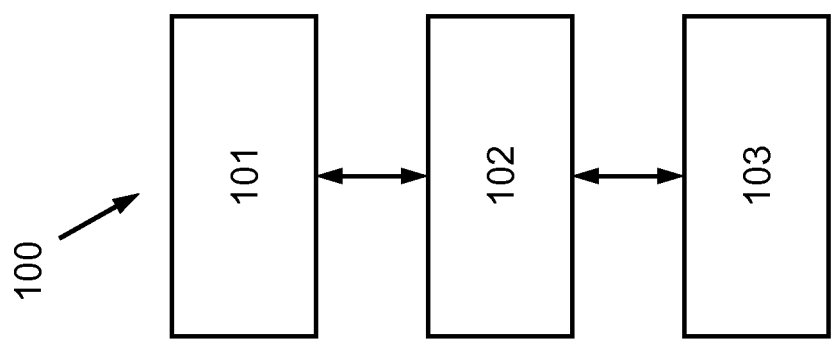

Referring to FIG. 1A, one embodiment of a firewall system 100 is illustrated, where a firewall 102 is connected to a data device 101 and a removable mass storage device 103.

The data device 101 in the embodiment refers to a device wherein data transfer may occur between this device and a removable mass storage device, such as the removable mass storage device 103. Examples of the data device 101 may include any type of computer, a digital camera, or an MP3 player, etc. In the embodiments of the present invention, a computer may be used as an example of a data device for the convenience of description. However, use if a computer as an example of a data device should not be construed as a limitation for the data device in the embodiments of the present invention.

The firewall 102 is a stand-alone device that may work as an entity to control and secure the data transfer between the data device 101 and the removable mass storage device 103. That is, the firewall 102 may control ways data is transferred between a removable mass storage and a data device, and control data to be transferred between a removable mass storage and a data device, etc. Securing the data transfer here may include user authorization, data protection and anti-virus, and other applicable equivalents. For example, the firewall 102 may restrict the data to be transferred utilizing a series of criteria, such as data type, data size etc. Also, the firewall 102 may scan and filter data to be transferred between the data device 101 and the removable mass storage device 103 to prevent virus from being spread through data transfer. Additionally; the firewall 102 may encrypt data to be transferred to the removable mass storage device 103, to protect the data. In addition, the firewall 102 may only allow authorized users to transfer data between the data device 101 and the removable mass storage device 103, e.g., authorizing a user by requesting a user name and a password; or the firewall 102 may only allow registered applications, e.g., Microsoft Office Word, to access the removable mass storage device 103. In one embodiment, the control and security may be implemented by setting up data transfer configurations and criteria, according to which the firewall 102 operates. Virus definitions may further be provided to the firewall 102 for anti-virus purpose of the data transfer.

Alternatively, the firewall 102 may support connections to multiple data devices and/or multiple removable mass storage devices. In this instance, multiple removable mass storage devices may share the single firewall 102 to access one or more data devices.

A removable mass storage device in the embodiments of the present invention, such as the removable mass storage device 103 in FIG. 1A, may include, but not limited to, a USB flash drive, a memory stick, a Secure Digital (SD) memory card, a compact flash card, an external hard-drive, or a CD/DVD player, etc. The present invention may be applied to any type of removable mass storage device without departing the spirit and scope of the present invention. These removable mass storage devices are popular media that may be used to extend a computer memory, backup data, or carry data.

FIG. 1B is an alternative embodiment of a firewall system 110, where a firewall 112 is an internal component of a data device, such as a computer 111 in this embodiment. The computer 111, which may comprise a CPU board 114 and the firewall 112, may be protected utilizing the firewall 112 to control and secure data transfer between the computer 111 and a removable mass storage device 113.

FIG. 1C is another embodiment of a firewall system 120, where a firewall 122 is an internal component of a removable mass storage device 124. The removable mass storage device 124 may comprise a mass storage 123 and the firewall 122. The mass storage device 124 may be protected utilizing the firewall 122 to control and secure data transfer between the removable mass storage device 124 and a computer 121.

Figure 2:
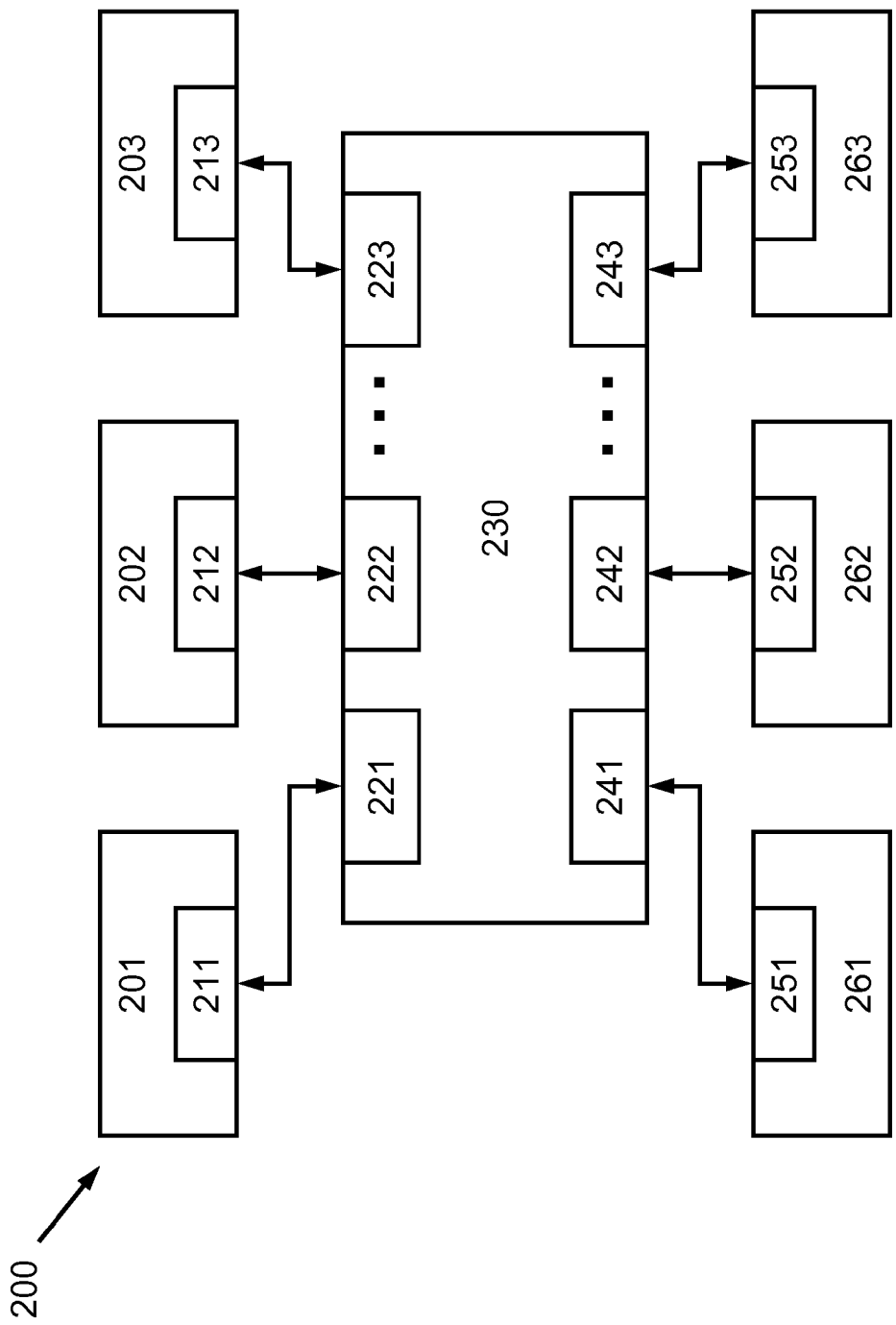
FIG. 2 is a diagram illustrating an embodiment of a firewall with connections to multiple removable mass storage devices and multiple data devices according to the present invention.

FIG. 2 illustrates a diagram 200 for one embodiment of a stand-alone firewall 230 with connections to multiple data devices, i.e. multiple computers in this embodiment, and multiple removable mass storage devices. As illustrated in FIG. 2, a computer 201 is connected to the firewall 230 through a computer side connector 211 and a firewall side connector 221. Firewall 230 is further connected to a removable mass storage device 261 through another firewall side connector 241 and a storage device side connector 251. Thus, the firewall 230 is connected to the computer 201 and the removable mass storage device 261 through the connectors 211, 221, 241, and 251.

In similar fashion, firewall 230 is connected to another computer 202 and another mass storage device 262 through connectors 212, 222, 242, and 252. Similarly, firewall 230 is connected to another computer 203 and another removable mass storage device 263 through connectors 213, 223, 243, and 253.

The connectors 211, 221, 212, 222, 213 and 223 for connecting the firewall 230 and the computers 201, 202, and 203 may be different kinds of connectors including, but not limited to, USB, firewire (IEEE 1394), RS232, parallel, Small Computer System Interface (SCSI), or Ethernet interfaces, etc. Alternatively, the connectors 211, 221, 212, 222, 213, and 223 may also be connectors supporting various wireless connections which may include, but not limited to, WIFI, WiMAX, Bluetooth, IrDA, wireless USB or Zigbee.

Connectors 241, 251, 242, 252, 243 and 253 for connecting firewall 230 and removable mass storage devices 261, 262 and 263 may be connectors supporting USB devices, memory sticks, Secure Digital (SD) memory cards, compact flash cards, external hard-drives or CD/DVD players with firewire (IEEE 1394), etc.; or may include firewire (IEEE 1394), RS232, parallel, SCSI, or Ethernet interfaces, etc. Connectors 241, 251, 242, 252, 243 and 253 may also support various wireless connections, such as WIFI, WiMAX, Bluetooth, IrDA, wireless USB or Zigbee.

Figure 3:
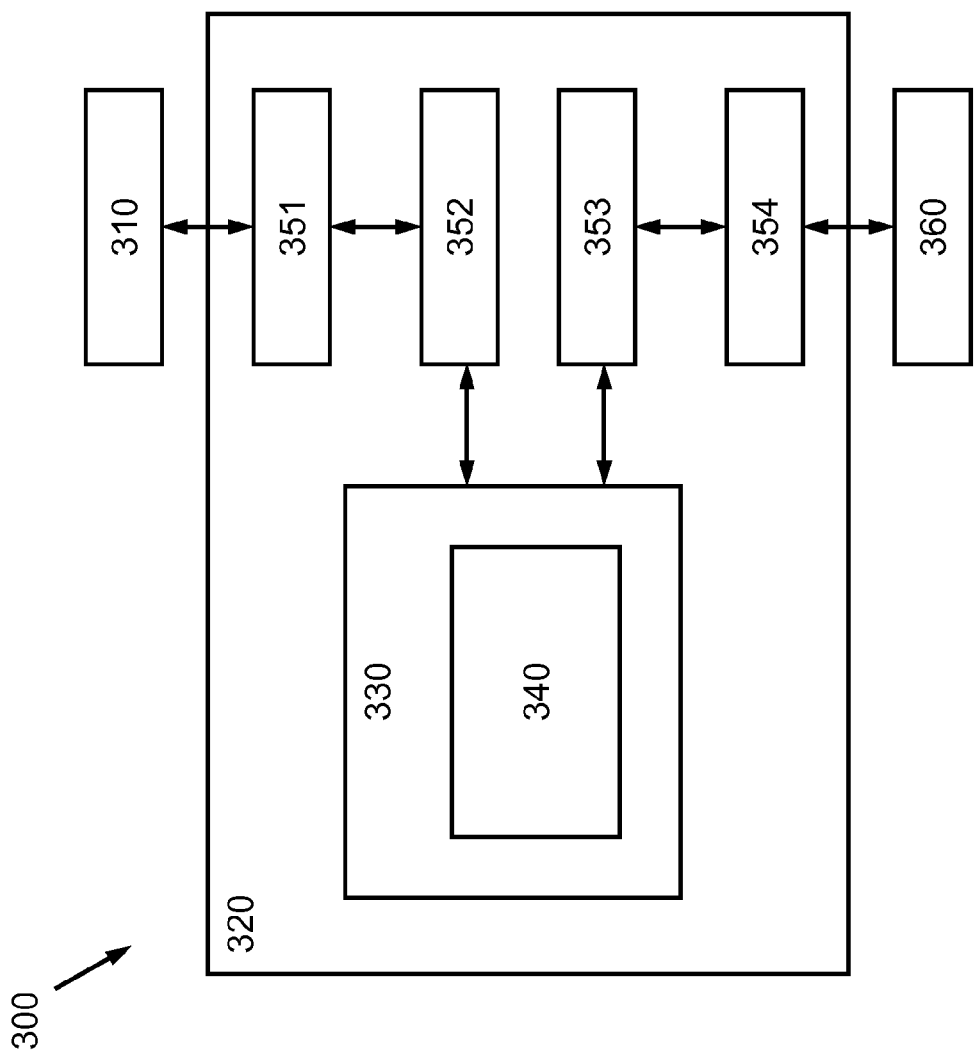
FIG. 3 illustrates one embodiment of a hardware structure of a firewall according to the present invention.

FIG. 3 illustrates a diagram 300 for one embodiment of a hardware structure of a stand-alone firewall 320. The firewall 320 may comprise a microprocessor or a microcontroller 330, which may further comprise a firewall internal memory 340. The internal memory 340 may store firmware and/or software supporting operations of the firewall 320, and may further store configurations, criteria, and virus definitions for the firewall 320. Alternatively, the internal memory 340 may be located outside the microprocessor 330. As illustrated in FIG. 3, the firewall 320 further comprises a data device connector 351, a data device driver 352, a storage device connector 354, and a storage device driver 353. The data device driver 352 corresponding to the data device connector 351 converts signals into digital data with proper electronic characteristics and transfers the digital data between the microprocessor 330 and a data device 310. Similarly, the storage device driver 353 corresponding to the storage device connector 354 converts and transfer data between the microprocessor 330 and a removable mass storage device 360.

A person of ordinary skill in the art should understand that the firewall 320 may include multiple data device connectors, data device drivers, storage device connectors and storage device drivers, to connect with multiple data devices and multiple removable mass storage device, as illustrated in FIG. 2. In this case, different types of the data device connectors 351 for the multiple data devices 310 and different types of storage device connectors 354 for the multiple removable mass storage devices 360 may be used. Each type of a data device driver may correspond to a compatible data device connector, and each type of a storage device driver may correspond to a compatible storage device connector.

In an alternative embodiment, where a firewall is an integral part of a data device as shown in the case of FIG. 1B, the firewall may not need to have the data device connector 351 as shown in FIG. 3, because the firewall may directly exchange data with the data device through the data device driver 352.

In yet another embodiment where a firewall is an integral part of a removable mass storage device as shown in the case of FIG. 1C, the firewall may not need to have the storage device connector 354, because the firewall may directly exchange data with the removable mass storage device through the storage device driver 353.

The microprocessor 330 may centrally control operations of the firewall 320, including controlling and securing data transfer according to configurable configurations criteria and virus definitions, such as scanning, or filtering data that passes through the firewall 320 for anti-virus utilizing virus definitions. In one embodiment, a firmware may be run on the microprocessor 330, controlling behavior of the firewall 320. The firmware may be stored in the internal memory 340.

Software may be stored in the internal memory 340. The software may be used to configure the firewall 320, set up criteria for the firewall 320, or provide virus definitions to control or secure data to be transferred between the data device 310 and the removable mass storage devices 360. The software may be a computer application program. A computer that is connected with the firewall 320, may download the software from the internal memory 340 and run the software on the computer. Alternatively, the software may be installed on a local hard drive of a computer, and run on the computer.

The configuration and criteria for the firewall 320 constructed via the software may be downloaded to the internal memory 340, and, the firmware on the microprocessor 330 may run to control and secure data transferred according to the configuration and criteria. Virus definitions may also be provided via the software and used for scanning virus in data transferred, and the virus definitions may be stored in the internal memory 340.

Figure 4:
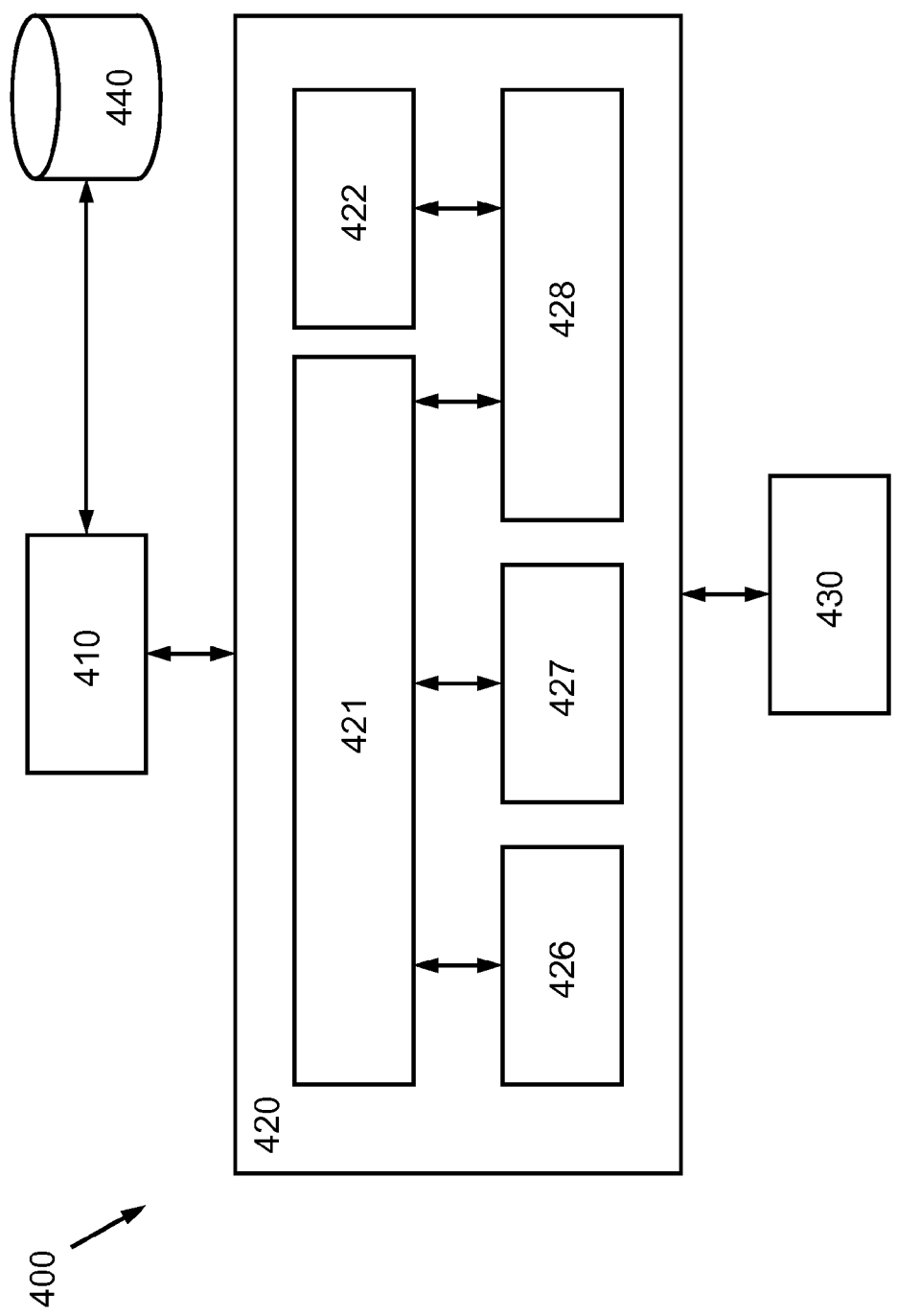
FIG. 4 is a diagram illustrating one embodiment of a firewall according to the present invention.

FIG. 4 is a diagram 400 illustrating an embodiment of implementation of a firewall 420 for controlling and securing data transfer according to the present invention. The firewall 420 may be a stand-alone firewall, or as described earlier in FIGS. 1B and 1C, an integral part of a data device 410 as in FIG. 1B, or an integral part of a removable mass storage device 430 as in FIG. 1C.

In FIG. 4, the firewall 420 includes a microprocessor 421, which communicates with a checking file component 426, a transfer file component 427, and a compress and encrypt file component 428. In addition, a virus definition component 422 may be included in the firewall 420 communicating with the compress and encrypt file component 428. In an alternative embodiment, other virus definitions 440 may be added in the firewall 420 through the data device 410.

The microprocessor 421 may perform file or directory checking, data transferring, and criteria checking for compression and/or encryption. The checking file component 426 may be a folder or a file for containing directory names, data contents, date, size, etc.; the transfer file component 427, which may be file or folder, may contain information for transferring one or more whole files or directories, or one or more authorized files or directories; and the compress and encrypt file component 428, which may be a folder or a file, may contain information for compressing and/or encrypting one or more whole files or directories, or one or more authorized files or directories. The compress and encrypt file component 428 may support compressing and/or encrypting a virus scan file.

Figure 5:
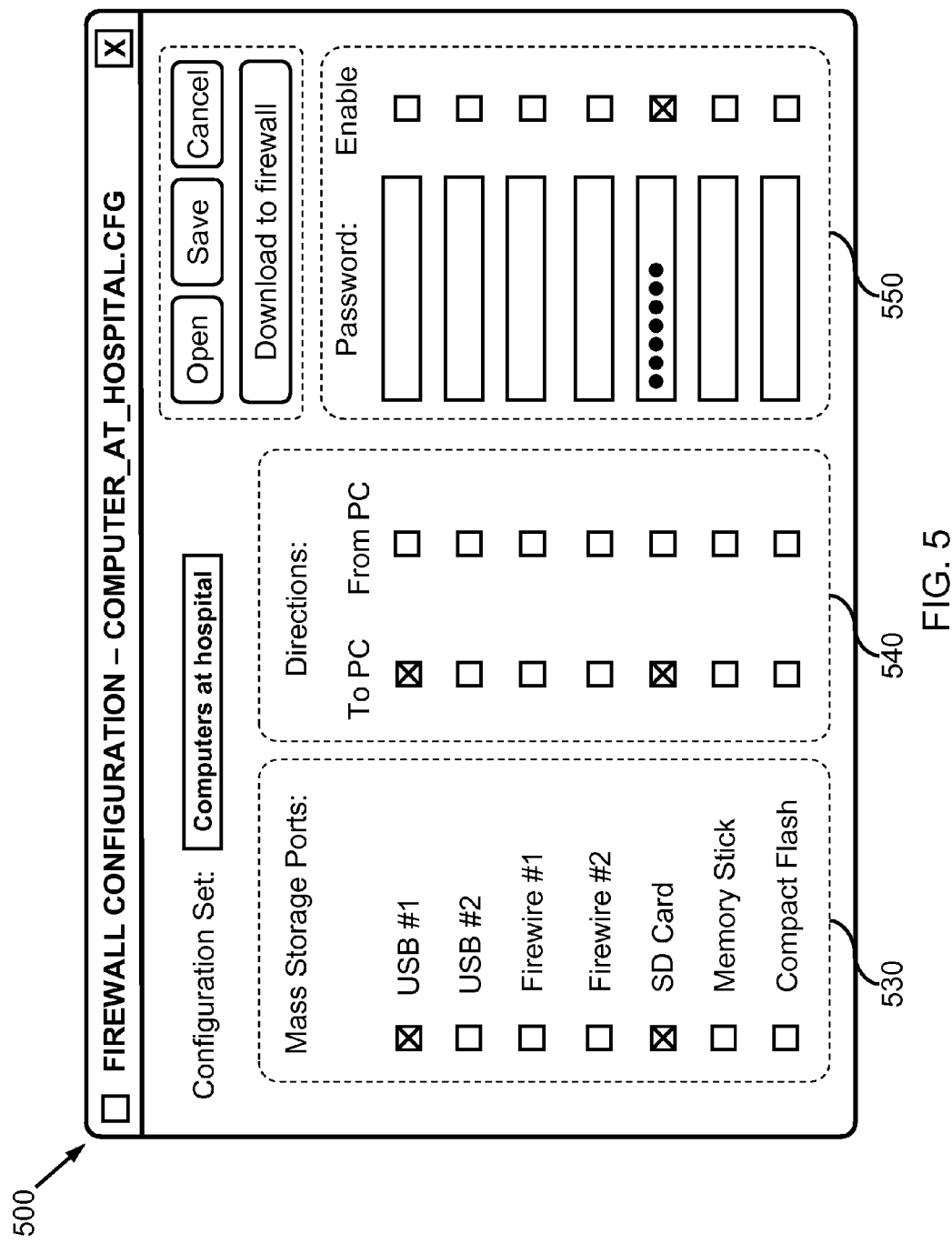
FIG. 5 is a diagram illustrating one embodiment for setting up firewall configuration according to the present invention.

FIG. 5 depicts one embodiment of a user-interface 500 of software running on a computer for configuring a firewall. A firewall's hardware related behavior may be based on the configuration set up through the user-interface 500. For example, a firewall may be configured to only allow data to be transferred to/from a removable mass storage device connected through a USB or a SD card port, which may be set up in section 530 to allow data to be transferred from a removable mass storage device to a Personal Computer (PC) and/or blocks data from a PC to a removable mass storage device in section 540 or to enable a password protection via section 550.

Figure 6:
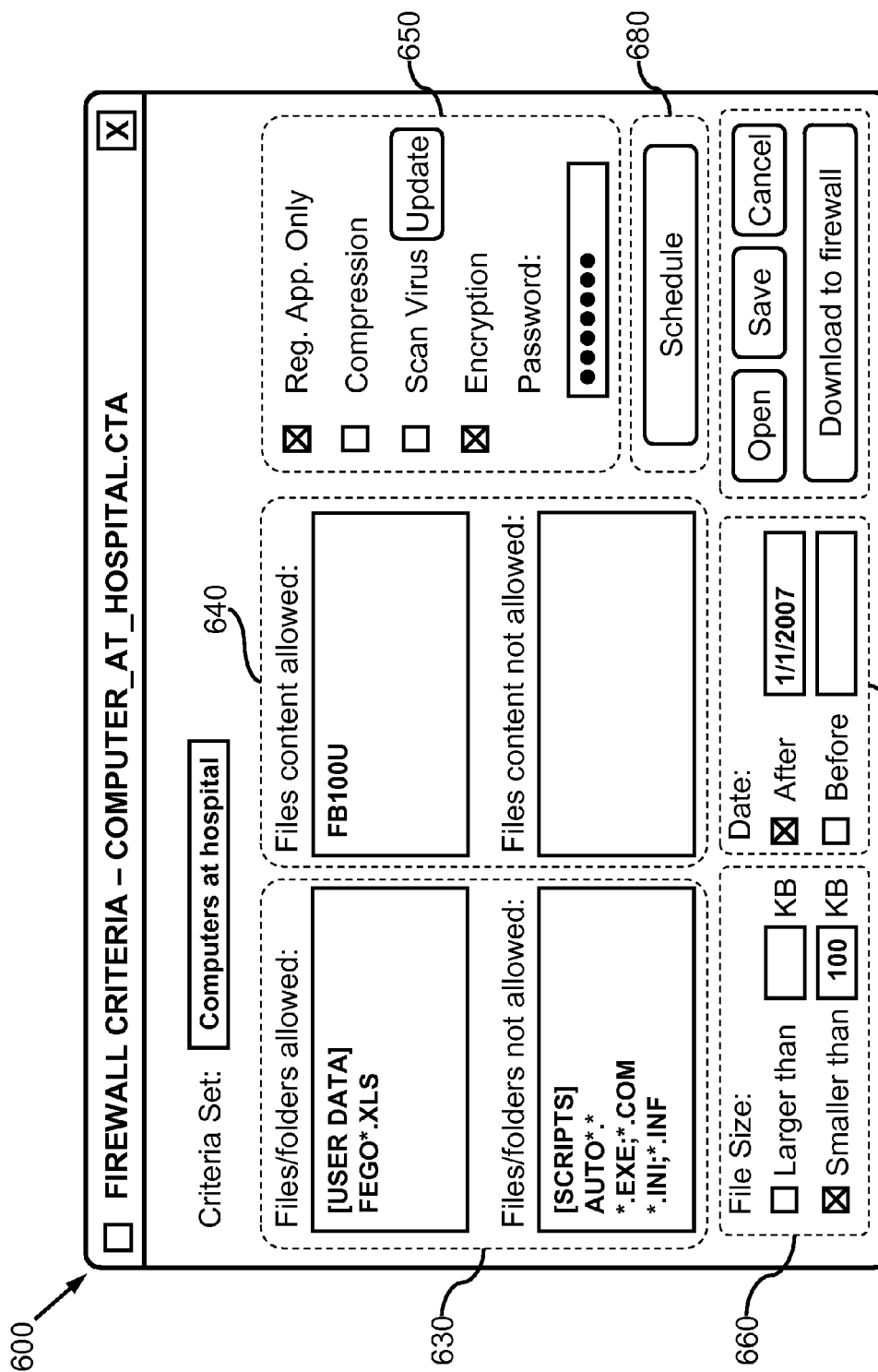
FIG. 6 is a diagram illustrating one embodiment for setting up firewall criteria according to the present invention.

FIG. 6 depicts one embodiment of another user-interface 600 utilized for setting up criteria of a firewall. The firewall may control data to be transferred, such as screening and processing data, using the criteria set up. As illustrated in FIG. 6, criteria may be set up for allowing or not allowing specific data to be transferred according to file names, file folders, file content, file size, file creating date, etc, in sections 630, 640, 660, and 670, respectively.

Compression/decompression or encryption/decryption feature may be enabled in section 650. For example, a file or a directory may be compressed and/or encrypted when a file or a directory is transferred from a computer to a removable mass storage device. A file or a directory may be uncompressed and/or decrypt when a file or a directory is transferred from a removable mass storage device to a computer.

A user may also set up in section 650 whether or not only registered application software is allowed to access a removable mass storage device via a firewall and transfer data. Application software running in a data device, such as the Microsoft Office Word, or Adobe Photoshop running in a computer, may communicate with a removable mass storage device connected with the data device. The application software may get registered with a firewall by obtaining an authorization key, and this authorization key allows the registered application software to access a removable mass storage device by way of the firewall and initiate data transfer. If "Reg. App. Only" in section 650 is not checked, then any kind of application software may be allowed to communicate with a removable mass storage device using the firewall to control and secure the data transfer. If "Reg. App. Only" is checked, then only application software with an authorization key, i.e., a registered application software, may use the firewall and initiate data transfer with a removable mass storage device. This feature may reduce risks to pass virus between a data device and a removable mass storage device when application software running in a computer accesses data in the removable mass storage device, and provide control over data transfer between the data device and the removable mass storage device.

Moreover, a virus scanning feature may be enabled in section 650 to scan files passing through the firewall according to virus definition information. As illustrated in FIG. 4, virus definitions may be stored internally in a firewall, such as the virus definition component 422, or be downloaded from a database on the Internet or a Local Area Network (LAN) via a computer. A user may also set up a schedule in section 680 of one or more time windows, within which a file transfer may be performed.

In addition, the firewall in the embodiments of the present invention may be configured to remove Macro from files of various formats, such as Microsoft Office Word, Excel, or Access files. Microsoft Office Word, Excel, and Access files are often used to hold documents, data, images, or charts. Microsoft Office Word, Excel, or Access allows users to write Macro, i.e., a script or a program, to manipulate documents or data in a file or in a computer. Macro is generally embedded in a file and is used to eliminate the need to repeat steps of common tasks over and over. However, the Macro may contain virus that may destroy files in a computer.

The firewall may have such a feature that Macro may be removed from a file regardless the Macro is contaminated with Virus or not, when the file passes the firewall in a data transfer between a data device and a removable mass storage device. The feature is configurable (e.g., enabled or disabled) using software running on a computer. Once the feature is enabled, a file, such as an Excel file, may be transferred between a data device and a removable mass storage device with all Macro in the file removed by the firewall. The filtered file contains the original data and format but has no Macro in the file for manipulating data.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A firewall device for a removable mass storage device, comprising:
    a first connector for connecting with a data device supporting data transfer with the removable mass storage device;
    a second connector for connecting with the removable mass storage device; and
    a microprocessor, adapted to filter data to be transferred from the data device to the removable mass storage device and from the removable mass storage device to the data device according to a predefined data transfer criterion, and adapted to perform a method that compresses, decompresses, encrypts or decrypts the data before the data is transferred according to the predefined data transfer criterion, the method comprising:
    determining whether the data is allowed to be transferred according to the predefined data transfer criterion by checking one or more data attributes or content of the data to be transferred;
    if the data is allowed to be transferred, determining whether multiple files or directories of the data are allowed to be transferred according to the predefined data transfer criterion; and
    performing encryption, decryption, compression or decompression of the data to be transferred according to the predefined data transfer criterion.

2. The firewall device in claim 1, wherein the removable mass storage device comprises a USB flash drive, a memory stick, a secure digital memory card, a compact flash card, an external hard-drive, or a CD/DVD player.

3. The firewall device in claim 1, wherein the data device comprises a computer.

4. The firewall device in claim 1, wherein the microprocessor is further adapted to control direction in which data is transferred between the data device and the removable mass storage device.

5. The firewall device in claim 1, wherein the microprocessor is adapted to filter the data to be transferred according to file name, file folder, file content, file size, or file creating date.

6. The firewall device in claim 1, wherein the microprocessor is further adapted to provide user authorization for the data to be transfer between the data device and the removable mass storage device.

7. The firewall device in claim 1, wherein the microprocessor is further adapted to remove macro from the data to be transferred between the data device and the removable mass storage device.

8. The firewall device in claim 1, wherein the microprocessor is adapted to set up a time window within which data is allowed to be transferred between the data device and the removable mass storage device.

9. The firewall device in claim 1, wherein the microprocessor is further adapted to determine whether only registered application software in the data device is allowed to transfer data to or receive data from the removable mass storage device.

10. The firewall device in claim 1, wherein the predefined data transfer criterion is configurable.

11. The firewall device in claim 1, wherein the predefined data transfer criterion is downloaded from Internet or a Local Area Network (LAN).

12. The firewall device in claim 1, wherein the first or second connector supports wired connection or wireless connection.

13. The firewall device in claim 1, wherein the second connector for connecting with the removable mass storage device comprises a connector supporting connection with a USB device, a memory stick, a secure digital memory card, a compact flash card, an external hard-drive or a CD/DVD player.

14. The firewall device in claim 1, wherein the first or second connector comprises a connector comprising a firewire (IEEE 1394) interface, a RS232 interface, a parallel interface, a Small Computer System Interface (SCSI), a USB interface, or an Ethernet interface.

15. The firewall device in claim 1, wherein the first or second connector supports connection of WIFI, WiMAX, Bluetooth, IrDA, wireless USB or Zigbee.

16. A removable mass storage device, comprising: a connection device for connecting with a data device supporting data transfer with the removable mass storage device; a first memory component for storing data; and a firewall component the firewall component being adapted to filter data to be transferred from the removable mass storage device to the data device and from the data device to the removable mass storage device according to a predefined data transfer criterion, and adapted to perform a method that compresses, decompresses, encrypts or decrypts the data before the data is transferred according to the predefined data transfer criterion, the method comprising:

determining whether the data is allowed to be transferred according to the predefined data transfer criterion by checking one or more data attributes or content of the data to be transferred;

if the data is allowed to be transferred, determining whether multiple files or directories of the data are allowed to be transferred according to the predefined data transfer criterion; and performing encryption, decryption, compression or decompression of the data to be transferred according to the predefined data transfer criterion.

17. The removable mass storage device in claim 16, wherein the firewall component further comprises a microprocessor.

18. The removable mass storage device in claim 16, wherein the firewall component is further adapted to control direction in which data is transferred between the data device and the removable mass storage device.

19. The removable mass storage device in claim 16, wherein the firewall component is adapted to filter the data to be transferred according to file name, file folder, file content, file size, or file creating date.

20. The removable mass storage device in claim 16, wherein the firewall component is further adapted to provide user authorization for the data to be transfer between the data device and the removable mass storage device.

21. The removable mass storage device in claim 16, wherein the firewall component is further adapted to remove macro from the data to be transferred between the data device and the removable mass storage device.

22. The removable mass storage device in claim 16, wherein the firewall component is adapted to set up a time window within which data is allowed to be transferred between the data device and the removable mass storage device.

23. The removable mass storage device in claim 16, wherein the firewall component is further adapted to determine whether only registered application software in the data device is allowed to transfer data to or receive data from the removable mass storage device.

24. A firewall device for a removable mass storage device, comprising:

a first connector supporting wired connection or wireless connection, for connecting with a data device supporting data transfer with the removable mass storage device;

a second connector supporting wired connection or wireless connection, for connecting with the removable mass storage device;

a memory device for storing a predefined data transfer criterion; and a microprocessor, adapted to filter data to be transferred from the data device to the removable mass storage and from the removable mass storage device to the data device according to the predefined data transfer criterion, and adapted to perform a method that compresses, decompresses, encrypts or decrypts the data before the data is transferred according to the predefined data transfer criterion, the method comprising:

determining whether the data is allowed to be transferred according to the predefined data transfer criterion by checking one or more data attributes or content of the data to be transferred;

if the data is allowed to be transferred, determining whether multiple files or directories of the data are allowed to be transferred according to the predefined data transfer criterion; and performing encryption, decryption, compression or decompression of the data to be transferred according to the predefined data transfer criterion;

wherein the microprocessor is further adapted to control direction in which data is transferred between the data device and the removable mass storage device, to filter the data to be transferred according to file name, file folder, file content, file size, or file creating date, to provide user authorization for the data to be transferred, to remove macro from the data to be transferred, to determine whether only registered application software in the data device is allowed to transfer data to or receive data from the removable mass storage device, or to set up a time window within which data is allowed to be transferred between the data device and the removable mass storage device.

\* \* \* \* \*